2,955,843
Patented Oct. 11, 1960

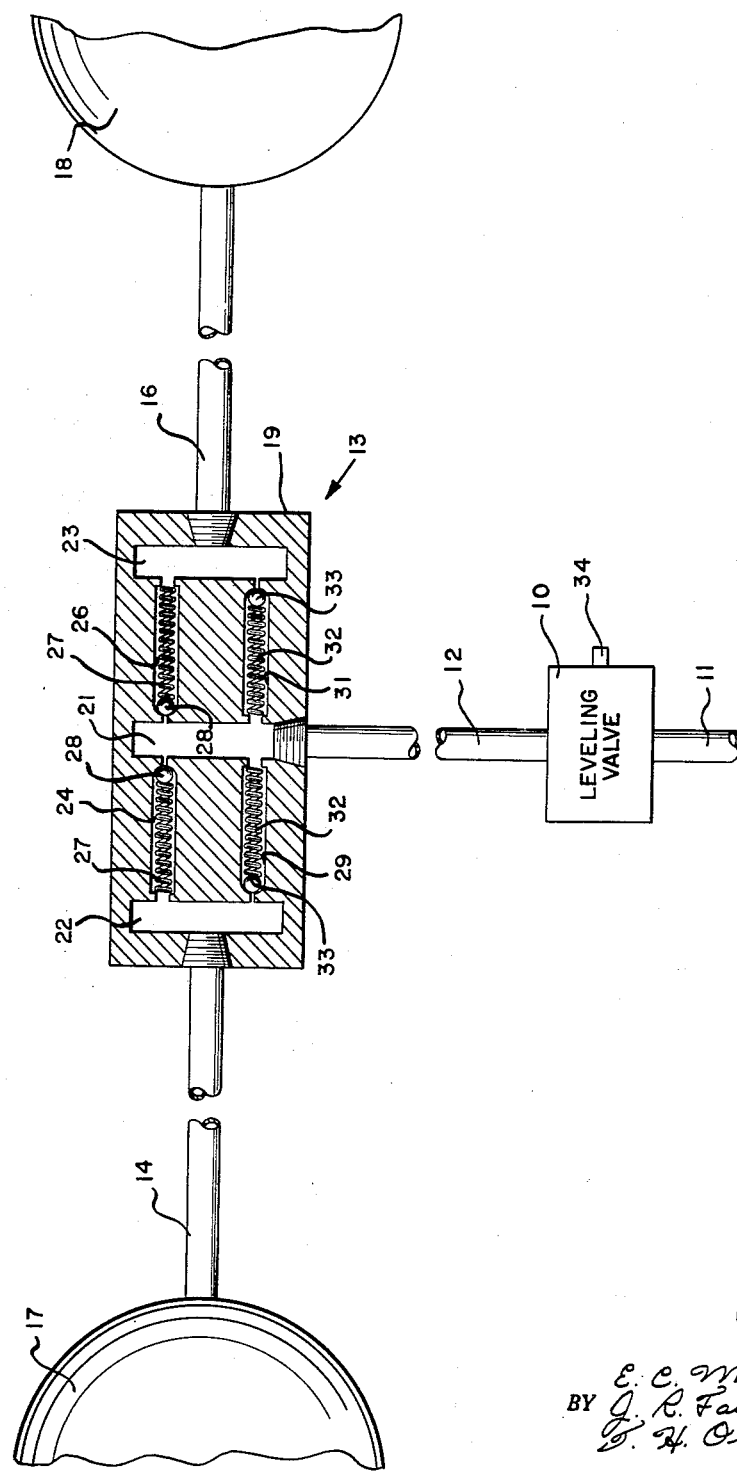

2,955,843
AIR SUSPENSION SYSTEM HAVING A CROSS FLOW CONTROL VALVE

Paul E. Chuba, Chicago, Ill., assignor to Ford Motor Company, Dearborn, Mich., a corporation of Delaware Filed Nov. 25, 1957, Ser. No. 698,583

3 Claims. (Cl. 280—124)

This invention relates to an air suspension system used in automotive vehicles and the like. In particular, it relates to a novel cross flow valve for use between two air springs served by a single leveling valve.

In an air suspension system, the height adjustment of the air spring may be accomplished through a chassis component which actuates a leveling valve which allows air to enter or leave the air spring. In the suspension system employing two air springs served by one leveling valve, the leveling valve may call for an adjustment in height for a situation which is temporary.

The use of one leveling valve for two air springs does present problems because of the open communication between the two air springs. In cornering a vehicle or going around a curve in the road, the vehicle body is subjected to roll whereby the air spring on the inside of the turn is extended and the air spring on the outside of the turn is compressed. Air pressure in the extended spring is decreased, while air pressure in the compressed spring is, of course, increased. Because the springs are open to each other, the high pressure spring will loose a certain amount of air to the low pressure spring commensurate with the extent and severity of the turn, and body roll resistance will decrease rather than increase as is desired. One of the important objects of this invention, therefore, is to provide a cross flow control valve preventing the movement of air from one spring to another, in an air spring system where two springs are served by one leveling valve.

Another situation of equal importance arises where the vehicle trim is disturbed, also of a temporary nature and the leveling valve calls for the exhaustion of air from the air bags to regain the vehicle trim. Such a situation may arise not only in the cornering of a vehicle, but also upon the hanging up of the vehicle bumper on a rock or post, the falling of one of the vehicle wheels in a hole, and the raising of the vehicle body by jacking to replace a flat tire. In this, and similar situations, the substantial exhaustion of air from the springs could be detrimental to the continued safe operation of the vehicle upon the resumption of normal driving. For example, air pressure in the springs may reach atmospheric pressure in the situation where the body is hung up. Another object of the invention is to provide a cross flow control valve for use between two air bags served by one leveling valve which also prevents the exhaustion of air from the individual air spring when the air pressure in that spring has reached a predetermined minimum.

In an embodiment of the applicant's invention, air from a positive supply passes through the leveling valve through the cross flow control valve, and from the latter to the two air springs. In the exhaust operation, air from the springs passes through the cross flow control valve and out through the leveling valve. The cross flow control valve itself comprises a central chamber having an exhaust and intake passage communicating with the central chamber and the individual air springs. A check valve of a normal p.s.i. is located in each of the intake passages while another check valve equal to the full rebound pressure of the air spring is placed in each of the exhaust passages. It can be seen, therefore, that the air pressure will never be in excess of the full jounce pressure, and the differential between the minimum pressure of the exhaust valve setting and full jounce pressure is less than the minimum rebound pressure plus the nominal spring pressure of the intake check valve, thus effectively preventing the movement of air from one spring to the other.

It can be seen, therefore, that with this type of valve, only one leveling valve is required of any design which can take care of two wheels. A further advantage resides in that the air is not transferred from one spring into another upon a temporary condition. Still a further advantage resides in the fact that a minimum pressure will be maintained in the air spring at all times.

Other objects and advantages will become more apparent as this description proceeds, particularly in connection with the accompanying drawings, in which:

The figure is a schematic drawing of a portion of an air suspension system incorporating the present invention.

Referring now to the drawings, air is received by the leveling valve 10 from a source of supply such as a compressor or reservoir (not shown) through conduit 11. The leveling valve 10 is then connected to the cross flow control valve 13 by conduit 12. The valve 13, in turn, is connected to individual air springs 17 and 18 (shown in part) by conduits 14 and 16. Actuation of the leveling valve 10 for adjusting the height of the air bags is accomplished through a chassis component (not shown), such as by an arm or other linkage.

It is to be noted that the arrangement comprising the two air springs controlled by one leveling valve may be used in either the front or rear of the vehicle depending upon the design of the suspension. For the purpose of this explanation, the air bag shown may be considered as part of a rear air bag suspension.

The cross flow control valve 13, shown diagrammatically, comprises a housing 19 having a central chamber 21 open to the conduit 12. A pair of outer chambers 22 and 23 are connected to the central chamber 21 by intake passages 24 and 26. The intake passages 24 and 26 are each provided with a spring 27 and a ball 28 which seats itself in the passages 24 and 26 for the purpose of closing the intake passages and the respective air springs from the leveling valve 10 and each other. Springs 27 may be conveniently set at a nominal rate of 5 p.s.i.

The exhaust passages 29 and 31 also connect the outer chambers 22 and 23 with the central chamber 21. It is to be noted that the outer chambers 22 and 23 are connected with the air springs 17 and 18 through conduits 14 and 16 respectively. The exhaust passages 29 and 31 are likewise each provided with compression springs 32 and balls 33 which normally close off the air springs from the leveling valve and each other. The spring rate of the exhaust springs 32 may be set at the minimum pressure desired to be maintained in the air spring. In this embodiment, the pressure of the exhaust valve spring has been set at the pressure of the air spring in full rebound, for illustration at 40 p.s.i.

For the purpose of explanation, we may assume that the air springs 17 and 18 have the following pressures: normal ride, 60 p.s.i.; full rebound, 40 p.s.i.; and, full compression, 80 p.s.i. When cornering a vehicle or negotiating a long curve, air pressure in one air spring will increase, while the air pressure in the opposite air spring decreases as a result of body roll. Assuming a left turn, the air pressure in air spring 17 (the right spring) increases sufficiently to unseat the exhaust valve 33 in the exhaust passage 29 so that the air will pass into the central chamber 21. At the same time, this air may attempt to go into the air spring 18, which is on the rebound side and has a lower air pressure. This is not possible because of the resistance of the 40 p.s.i. air pressure in the air spring 18, plus the 5 p.s.i. spring and because the maximum pressure obtainable in an air spring under full jounce position, minus 40 p.s.i. lost in exhaust valve operation, is less than the amount of 45 p.s.i. which is required to enter the low pressure spring.

As can be seen, the applicant's novel device effectively prevents the cross flow of air between air springs under temporary conditions and also prevents the exhaustion of air under a predetermined minimum.

A single leveling valve may now be used to effectively control two air springs without the usual disadvantage of open communication between the bags. If the leveling valve calls for exhaust, air will flow from the air bags to lower the vehicle to the position called for by the leveling linkage or until the air pressure reaches the minimum setting of the exhaust spring. This air will pass from the exhaust passages 29 and 31 through central passage 21, through conduit 12 into the leveling valve 10 and out through the port indicated generally at 34.

If the leveling valve calls for intake, air from the positive air supply will pass through the conduit 11, leveling valve 10 and conduit 12 into the central chamber 21 past the balls 28 and into the respective air springs.

It will be understood that the invention is not to be limited to the exact construction shown and described, but that various changes and modifications may be made without departing from the spirit and scope of the invention, as defined in the appended claims.

What is claimed is:

1. An arrangement for preventing the cross flow of air between a pair of interconnected motor vehicle air springs controlled by a single leveling valve, comprising in combination a pair of interconnected air springs, a source of pressurized air, a single leveling valve positioned between said source and the connected air springs, said leveling valve having a common passage through which air is permitted to pass from said leveling valve to said interconnected air springs and from said interconnected air springs to said leveling valve for controlling the air springs in accordance with vehicle height requirements, an intake and exhaust passage for each of the air springs, each of said passages communicating with an air spring and the leveling valve common passage, a check valve in each intake passage operable at a predetermined air pressure differential, a check valve in each exhaust passage operable at a predetermined air pressure differential which is greater than the pressure differential at which the intake check valve operates, said exhaust check valve maintaining a minimum air spring pressure independent of said leveling valve requirements.

2. A cross flow control valve for preventing the movement of air between two interconnected motor vehicle air springs controlled by a common leveling valve in accordance with vehicle height requirements, comprising a central port communicating with the leveling valve to permit the passage of air from said leveling valve to said flow control valve central port and from said flow control valve central port to said leveling valve, an air spring port for each of the air springs, each of said air spring ports communicating with an air spring, an intake and an exhaust passage communicating with each air spring port and the central port, an intake valve in each intake passage operable at a predetermined air pressure differential to admit air into the respective air spring, an exhaust valve in each exhaust passage operable at a greater predetermined air pressure differential than the intake valve differential pressure to exhaust air out of the air spring.

3. In a fluid suspension system for a motor vehicle a pair of conduit connected fluid springs, a fluid source, a leveling valve, conduit means connecting said fluid source to said leveling valve, flow control means disposed between said conduit connected fluid springs, a single conduit connecting said flow control means to said leveling valve to permit the passage of fluid from said leveling valve to said flow control means and from said flow control means to said leveling valve, said flow control means operable independently of said leveling valve, said flow control means including an intake check valve for each fluid spring operable at a predetermined fluid pressure differential to admit fluid into the respective fluid spring and an exhaust check valve for each fluid spring operable at a predetermined fluid pressure differential which exceeds substantially the predetermined fluid pressure differential of the intake check valve to exhaust fluid from the respective fluid spring, said intake and exhaust check valve for each fluid spring having a common access to said conduit connecting the flow control means and the leveling valve, the fluid pressure differential required to operate the intake check valve plus the fluid differential pressure required to operate the exhaust check valve exceeding the remaining fluid pressure in the respective fluid springs.

References Cited in the file of this patent
UNITED STATES PATENTS

| | | |
|---|---|---|
| 2,271,031 | Parker | Jan. 27, 1942 |
| 2,351,874 | Parker | June 20, 1944 |
| 2,809,051 | Jackson | Oct. 8, 1957 |
| 2,848,249 | Bertsch | Aug. 19, 1958 |